United States Patent [19]

Sjolander

[11] Patent Number: 6,128,587
[45] Date of Patent: Oct. 3, 2000

[54] METHOD AND APPARATUS USING BAYESIAN SUBFAMILY IDENTIFICATION FOR SEQUENCE ANALYSIS

[75] Inventor: Kimmen Sjolander, Lafayette, Calif.

[73] Assignee: The Regents of the University of California, Oakland, Calif.

[21] Appl. No.: 09/006,924

[22] Filed: Jan. 14, 1998

Related U.S. Application Data

[60] Provisional application No. 60/035,557, Jan. 14, 1997.

[51] Int. Cl.[7] .................................................. G06F 17/10
[52] U.S. Cl. .................................. 703/2; 703/11; 702/20
[58] Field of Search ........................ 395/500.32, 500.23; 702/19, 20, 27; 703/2, 11; 382/225, 228

[56] References Cited

U.S. PATENT DOCUMENTS

| | | | |
|---|---|---|---|
| 5,325,445 | 6/1994 | Herbert | 382/228 |
| 5,655,058 | 8/1997 | Balasuabramanian et al. | 704/255 |
| 5,701,256 | 12/1997 | Marr et al. | 702/20 |
| 5,832,182 | 11/1998 | Zhang et al. | 706/50 |
| 5,864,810 | 1/1999 | Digalakis et al. | 704/255 |
| 5,867,402 | 2/1999 | Schneider et al. | 702/20 |
| 5,912,989 | 6/1999 | Watanabe | 382/228 |

OTHER PUBLICATIONS

Wu et al.,"Gene Family Identification Network Design", Proceedings of the IEEE International Joint Symposia on Intelligence and Systems, pp. 103–110, May 1995.

Sankoff et al.,"Probability Models for Genome Rearrangement and Linear Invariants for Phlyogentic Inference", Proceedings of the Third Annual International Conference on Computational Molecular Biology, pp. 302–309, Jan. 1999.

Craven et al.,"Machine Learning Approaches to Gene Recognition", IEEE Expert, vol. 9, Issue 2, pp. 2–10, Apr. 1994.

Hirschberg et al.,"Kestrel: A programmable Array for Sequence Analysis", Proceedings of the International Conference on Applications Specific Systems, Architectures and Processors, pp. 25–34, Aug. 1996.

Yokomri et al., "Learning Local Languages and their Application to DNA Sequence Analysis", IEEE Transactions on Pattern Analysis and Machine Learning, vol. 20, Issue 10, pp. 1067–1079, Oct. 1998.

Krogh et al., "Hidden Markov Models in Computational Biology: Application to Protein Modeling", J. Mol. Biol. 235, pp. 1501–1531, Feb. 1994.

Kawahara et al.,"HMM Based on Pair–wise Bayes Classifiers", IEEE International Conference on Acoustics, Speech and Signal Processing, vol. 1, pp. 365–368, Mar. 1992.

Henikoff, S., "Comparative Methods for Identifying Functional Domains in Protein Sequences", Biotechnology Annual Review, pp. 129–147, 1995.

(List continued on next page.)

*Primary Examiner*—Kevin J. Teska
*Assistant Examiner*—Douglas W. Sergent
*Attorney, Agent, or Firm*—Flehr Hohbach Test Albritton & Herbert LLP

[57] ABSTRACT

An system and methodology procedure agglomeratively estimates a phylogenetic tree from MSA input data by creating a data model represented by each tree node by first estimating the number of independent observations in the data. A preferably relative entropy distance measurement made among nodes between subtrees determines which nodes in the model to merge at each agglomeration step. Cuts in the phylogenetic tree are made at points in the agglomeration at which minimized encoding cost is determined, preferably by using Dirichlet mixture densities to assign probabilities to observed amino acids within each subfamily at each position. Using subtree data, a statistical model, e.g., a profile or hidden Markov model, for each subfamily may be constructed in a position-dependent manner, which permits identifying remote homologs in a database search. Further, the invention provides an alignment analysis to identify key functional or structural residues. Finally, the invention may be carried out in automated fashion using a computer system in which a processor unit executes a storable routine embodying the preferred methodology.

43 Claims, 7 Drawing Sheets

OTHER PUBLICATIONS

Eddy et al., "Maximum Discrimination Hidden Markov Models of Sequence Consensus", Journal of Computational Biology, vol. 2, No. 1, pp. 9–23, Spring 1995.

Parker et al., "HomolgyPlot: Searching for Homology to a Family of Proteins Using a Database of Unique Conserved Patterns", Jour. of Comp. Aided Molecular Design, vol. 8, No. 2, Apr. 1994, pp. 193–210.

Asai et al., "Prediction of Protein Secondary STructure by the Hidden Markov Model", Comp. Applications in the Biosciences, vol. 9, No. 2, pp. 141–146, Apr. 1993.

Hughey et al., "Hidden Markov Models for Sequence Analysis: Extension and Analysis: Extension and Analysis of the Basic Method", Comp. Applications in the Biosciences, vol. 12, No. 2, pp. 95–107, Apr. 1996.

SEQ 01 D
SEQ 02 D
SEQ 03 —
SEQ 04 E
SEQ 05 E
SEQ 06 D
SEQ 07 D
SEQ 08 D
SEQ 09 D
SEQ 10 R
SEQ 11 D

A .01
C .01
D .8
E .1
F .01
G .01
H .01
I .01
K .02
L .001
M .001
N .001
P .001
Q .001
R .01
S .001
T .001
V .001
W .001
Y .001

| Col | Conserv. | Type | Waksman pos. | Notes: Waksman binding pocket residues |
|---|---|---|---|---|
| 4 | 1.0000000 | SS | Arg-Beta-B5 | A Margengere notes invariant |
| 31 | 1.0000000 | SS | Phe-Beta-B2 | A vicinity |
| 28 | 0.9996970 | SS | Phe-Beta-F3 | |
| 76 | 0.9925593 | SS | His-Beta-D4 | B Margengere notes invariant |
| 57 | 0.9986667 | GEN | Ser-Beta-B7 | A |
| 33 | 0.9885152 | SS | Val-Alpha-B6 | |
| 83 | 0.9882121 | SS | Tyr-Beta-D5 | B,C |
| 58 | 0.9873333 | SS | Gly-- AB7 | |
| 26 | 0.9771429 | AEC | Arg-Alpha-A2 | A |
| 11 | 0.9766667 | AEC | Ser-Beta-C5 | |
| 43 | 0.9963810 | SS | N-term | |
| 2 | 0.9959933 | SS | Leu-Beta-B3 | vicinity A (not noted) |
| 29 | 0.9958485 | AEC | Gly- BC5 | vicinity A |
| 38 | 0.9955556 | GEN | Leu-Beta-G8 | |
| 97 | 0.9953333 | AEC | Leu-Alpha-A9 | A vicinity |
| 18 | 0.9951661 | AEC | Glu-Alpha-A6 | A vicinity |
| 15 | 0.9951111 | SS | Leu-Beta-C4 | |
| 42 | 0.9950553 | GEN | Leu-Alpha-B5 | highly variant in sf9, also |
| 82 | 0.9948658 | SS | Gln-Alpha-B3 | variant between subfamilies |
| 80 | | | | |
| 70 | 0.9429680 | SS | Ile-Beta-E4 | B,C |
| 41 | 0.9406930 | SS | Cys-Beta-C3 | |
| 79 | 0.9404710 | GEN | Leu-Alpha-B2 | vicinity B |
| 55 | 0.9402020 | SS | Val-Beta-D2 | |
| 40 | 0.9309520 | SS | Tyr-Beta-C2 | |
| 44 | 0.9306780 | SS | Val-Beta-C6 | variant in sf9 |
| 14 | 0.9295800 | AEC | Ser-Alpha-A5 | Ala almost everywhere else |
| 71 | 0.9280610 | SS | Thr-EF-1 | Site C |
| 85 | 0.9260610 | SS | Tyr-Alpha-B8 | vicinity site C: F,Y,H |
| 86 | 0.9251520 | SS | Tyr-Alpha-B9 | Site C:Y,H,F,L |
| 3 | 0.9140680 | SS | N-term | |
| 32 | 0.9086530 | SS | Glu-Beta-B6 | vicinity site A: EKDPA variable in |
| 101 | 0.9085910 | SS | Cys-Beta-G3 | CVKIA |
| 72 | 0.9043290 | SS | Ser-EF-2 | vicinity site C |
| 30 | 0.9033330 | SS | Val-Beta-B4 | vicinity site A |
| 73 | 0.9017650 | SS | Arg-EF-3 | vicinity site C |
| 59 | 0.9012790 | SS | Lys-Beta-D6 | A,B |

Types={GEN=Same residue entirely conserved,AEC=Same residue almost entirely conserved
residues noted are from SRC_HUMAN

FIG. 6A

Binding Pocket Residues identified by Waksman et al
(comparison of Lichtarge and Bayesian methods)

|     | Lichtarge method | | Bayesian |
|-----|:----:|:----:|:----:|
|     | C2 | E1 | |

---- phosphotyrosine binding site ---

| R11 | * |   | * |
|-----|---|---|---|
| R31 | * | * | * |
| S33 | * | * | * |
| E34 |   |   |   |
| T35 |   |   |   |
| T36 |   |   |   |
| K59 |   | * | * |

---------- glutamate binding site --------

| K56 | * | * |   |
|-----|---|---|---|
| H57 | * | * | * |
| Y58 | * | * | * |
| K59 | * | * | * |
| R61 |   |   |   |
| I70 | * | * | * |

--------- hydrophobic pocket ---------

| Y58 |   | * | * |
|-----|---|---|---|
| I70 | * | * | * |
| T71 |   |   | * |
| Y86 | * | * | * |
| G92 | * |   |   |
| L93 | * | * |   |

"An Evolutionary Trace Method Defines Binding Surfaces Common to Protein Families", JMB '96. Lichtarge et al.

"Binding of a High Affinity Phosphotyrosyl Peptide to the Src SH2 Domain: Crystal Structures of the Complexed and Peptide-free Forms", Cell, vol. 72, 1993, Waksman et al.

FIG. 6B

METHOD AND APPARATUS USING BAYESIAN SUBFAMILY IDENTIFICATION FOR SEQUENCE ANALYSIS

REFERENCE TO OTHER APPLICATION

Priority is claimed to applicant's provisional U.S. patent application Ser. No. 60/035,557 filed on Jan. 14, 1997, entitled METHOD AND APPARATUS USING BAYESIAN SUBFAMILY IDENTIFICATION FOR SEQUENCE ANALYSIS. Applicant refers to and incorporates her said provisional patent application herein by reference.

FIELD OF THE INVENTION

The present invention relates generally to techniques for analyzing data including biosequence data, and more particularly to automated techniques for creating phylogenetic trees includes trees involving protein families, intelligently cutting such trees into subtrees to form subfamilies, creating statistical models for each subfamily from given subfamily decompositions, and analyzing conservation patterns to identify key positions in molecules.

BACKGROUND OF THE INVENTION

Genes are the blueprint for polypeptides and proteins, which in turn are comprised of chains of amino acids. The genetic message in nucleic acid form in DNA is transcribed into messenger RNA ("mRNA"), and is further decoded through translation to generate the specific amino acid sequence in protein biosynthesis. The resulting proteins typically fold up in solution. Genes and proteins interact in complex ways and play myriad roles in organisms. The Human Genome Project, which seeks to identify all genes in the human genome, has renewed interest in sequencing, e.g., in reading the code or blueprint represented by genes. But even when the many genes within the human genome are identified, it will still be necessary to understand gene functions within cells to make full use of such knowledge.

When a set of proteins have a common evolutionary history, this history is correlated with changes in the function and structure from their common ancestors. If the evolutionary history can be identified, one can construct a phylogenetic tree. However prior art techniques for phylogenetic tree inference mostly are techniques developed for DNA sequences, in which the presence of a relatively recent common ancestor permits simplified mathematical assumptions about how such sequences evolved over time.

The starting point for phylogenetic tree estimation is generally a multiple sequence alignment ("MSA"), such as shown in FIG. 1, which displays sequence alignment from different genes or proteins in an attempt to show common structure. MSAs may be constructed using various known techniques, and are publicly available from many sources including the Internet. If similarities can be perceived from MSA data, one may gain useful information as to common function and structure (or "conservation") between proteins.

Prior art techniques such as the distance-based or neighbor-joining method, the maximum likelihood method, and the parsimony method have been used for decades to infer phylogenetic relationships among species.

Evolutionary processes can include speciation and gene duplication. In speciation, a gene produces a protein having a particular function, and over time slight differentiation occurs in the protein as it evolves in different species. Thus, one type of phylogenetic inference, species trees are constructed with a topology in which the species form leafs (representing what is observed in the data) on a tree. Attempts are made to properly form the tree to show relationships, e.g., which is closer to man, the chimpanzee or the gorilla. Leaves may be joined to nodes or internal nodes, and the common ancestor will be found at the common root or root node of the tree. A species tree will reflect the evolutionary relationship between species.

In another type of phylogenetic inference, gene duplication events are modeled, in which paralogous genes or proteins are created. For examples, globins in plants, in muscles, in blood all stem from a common globin ancestor that antedated the split in speciation between plants and animals. Genes can be copied at any point along the species tree, with one gene retaining original functionality and a copied gene obtaining different function. In constructing an evolutionary tree for paralogous genes, a gene tree results in which genes are clustered within subtrees, and in which a common ancestor gene (that was subsequently copied) appears at the tree root.

Prior art techniques simply do not perform well in attempting to form phylogenetic inferences where gene duplication has occurred. This shortcoming appears to result because certain positions in a protein are very important to the function of the protein, e.g., residues in certain protein positions are extremely important as they determine what that protein will interact with, or the specific protein function. In gene duplication, the proteins that the genes encode have a freeing of functional and sometimes structural constrains. For example, amino acid constrains can change at some positions in the molecule, while some positions remain perfectly constrained, while other positions have subfamily-specific conservation.

In a set of sequences, one may divide conservation types into a few different variants, for example general variants (all of the proteins have the same type of conservation) or subfamily is specific. For these two divisions, conservation types may be perfectly preserved or may be variant. When a position is conserved within each subfamily ("sf") but can differ across subfamilies, a key exists for a kind of functional specificity of that group of proteins. Thus, if within a group of proteins or DNA a particular residue (e.g., amino acid or DNA nucleic acid) is required to be maintained, it is so required for reasons of structure or function, and not by chance. Therefore in terms of evolutionary distance, as diversity within a group containing this conservation key or signal increases, the signal will be a more important indicator that this position is significant.

In creating a phylogenetic tree with a group of different subfamilies, it is known that subfamily-specific conservation positions will have functional, phylogenetic, or evolutionary constraints. Thus, in forming a phylogenetic tree topology, the similarity at such constrained positions should be reflected as being more important as compared with similarity at positions that are very variant. This distinction cannot be made by prior art techniques for constructing phylogenetic trees. Simply stated, prior art techniques cannot identify such subfamily-specific well conserved positions.

Such shortcoming is aggravated by the reliance of prior art techniques upon substitution matrix-based methods in assessing penalties in joining two groups of proteins. Substitution matrices are used by biologist to form profiles of expected amino acids to homologs (or relatives) to a set of protein sequences. Each position in the profile corresponds to a column in an MSA for the proteins, and reflects the amino acids expected among homologs not contained in the data in the MSA. These methods employ only the relative frequency of the amino acids at each position in the MSA, and ignore the actual number of amino acids observed. Because of this, a column containing a single D is treated identically to one containing one hundred Ds. Substitution matrices generalize every position to allow amino acids similar to the observed amino acids at a given position. Such techniques create a profile or probability distribution of the expected amino acids over all the amino acids. However these techniques fail to identify functional or structural constraints within a phylogenetic tree under construction, and simply do not seek to identify a subfamily-specific conservation signal in determining what subtrees should be joined.

Phylogenetic trees can be used to identify subfamilies. Phylogenetic trees describe the often complex evolutionary relationships among a set of sequences. Such trees are challenging because the number of ways to cut a tree into subtrees is enormous, and it is computationally very expensive to examine all possible cuts. Compounding the problem is the typical lack of a priori knowledge of the correct number of subfamilies in the data. Phylogenetic trees can be cut into subtrees using known algorithms to define the subfamilies in the data. But although many phylogenetic tree construction algorithms are known, no automated methods for cutting a phylogenetic tree into subtrees to infer subfamilies in the data are found in the prior art.

Even when phylogenetic trees are employed in analysis, they are not used to help refine statistical models of subfamilies in the data. Employing all the pair wise relationships is currently computationally prohibitive, and with no automated ways to infer the subfamilies based on a phylogenetic tree, subfamily relationships are equally hard to incorporate into statistical models. While a phylogenetic tree may find use in supplementing a scientific understanding, they have not found use in statistical model construction. Thus, although there is a growing need for automated sequence analysis tools for large-scale annotation of sequence databases, it is not presently known how to incorporate the information in phylogenetic trees into automated tools.

At best, in the past incorporating subfamily relationships into statistical models meant modeling each subfamily separately. This prior art approach was not optimal as much valuable information concerning important positions defining the common fold or function of all the proteins as a whole was simply discarded.

Thus, there is a need for an agglomerative technique to create hierarchal or phylogenetic trees from MSA data to attain a more accurate understanding of functional and/or structural similarity of evolutionary history for proteins under analysis. Preferably such a technique should be automated to recognize the importance of functional and/or structural constraints in an MSA. Thus information should be used to determine what subtrees should be joined together.

There is a need for a preferably automated technique to guide cutting a phylogenetic tree into subtrees, preferably as a function of encoding cost at each node in the phylogenetic tree. Further, there is a need to create statistical models from data representing subtrees formed from the decomposition of a phylogenetic tree. Such models should be able to identify and align remote homologs. Further, there is a need for a technique to provide a position-by-position analysis from MSA data starting from subfamily decomposition data in which subfamily conservation residue signals are employed.

The present invention provides such techniques as well as an automated system for their implementation.

SUMMARY OF THE PRESENT INVENTION

In a first aspect, the present invention provides a method and system to agglomeratively estimate a topology of a phylogenetic tree from MSA input data. A model is created of data represented by each tree node by first estimating the number of independent observations in the data and using a distance measurement among nodes between subtrees to determine at each agglomerative step which nodes to merge in said model. Preferably the model is created using Bayesian techniques that can employ Dirichlet mixture densities as priors over amino acid distributions to create profiles, and preferably the distance measure is a symmetrized form of relatively entropy summed over all the columns in the MSA.

In a second aspect, an appropriately formed phylogenetic tree is cut to form subfamilies by identifying points in the tree at which the agglomeration encoding cost is minimized. Preferably encoding costs are determined using Dirichlet mixture densities, under several hypotheses, to assign probabilities to individual amino acids within each subfamily at each position.

In a third aspect, a statistical model is created for each subfamily identified by the minimum encoding cost measurement. Preferably the models are of the tree. Preferably the models are profiles or hidden Markov models ("HMM"), and are formed in a position-dependant manner using Dirichlet densities In a fourth aspect, a position-by-position analysis is provided from multiple sequence analysis data, given a subfamily decomposition. Within each subfamily, an average conservation signal is computed, preferably using Bayesian analysis, across subfamilies at each position, the conservation preferably being identified as general or subfamily specific. Preferably positions are identified showing variable physico-chemical constraints among amino acid subfamilies.

Preferably a software routine embodying the present invention is stored or loadable into memory for execution by a processor unit, such as found in a computer system. Such implementation permits automating analysis according to the present invention.

Other features and advantages of the invention will appear from the following description in which the preferred embodiments have been set forth in detail, in conjunction with the accompanying drawings.

BRIEF DESCRIPTION OF THE DRAWINGS

FIG. 6A shows key functional residues identified by Waksman using a prior art mutation experimental technique;

FIG. 6B depicts correlation between binding pocket residues identified by two Lichtarge methods, and by a Bayesian method, according to the present invention.

DETAILED DESCRIPTION OF THE PREFERRED EMBODIMENT

Applicant incorporates herein by reference her doctoral dissertation, A BAYESIAN-INFORMATION THEORETIC METHOD FOR EVOLUTIONARY INFERENCE IN PROTEINS, University of California, Santa Cruz, Calif. (June, 1997). Applicant also refers to and incorporates herein her treatise BAYESIAN EVOLUTIONARY TREE ESTIMATION (Aug. 13, 1997), a copy of which is appended hereto.

Figure 2:
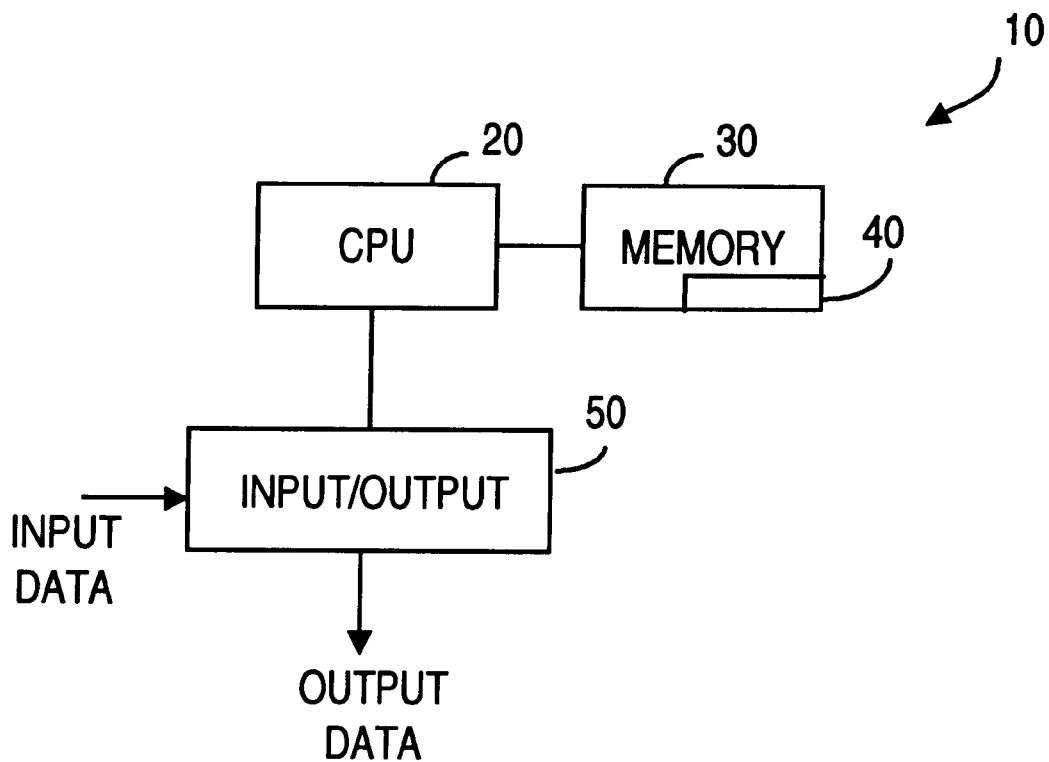
FIG. 2 depicts a generalized computer system with which a routine embodying the present invention may be carried out.

The present invention may be carried out in automated fashion using a combination of hardware and software such as computer system 10, depicted generically in FIG. 2. As shown in FIG. 2, computer system 10 includes at least a processor unit 20 coupled to memory 30 (e.g., persistent and volatile memory). Stored or loadable into memory 30 is a routine 40 that when executed by processor unit 20 carries out the various methods defined by the present invention. An input/output unit 50 is coupled to system 10 to allow raw data to be input to the system, and to receive output data that has been provided by system 10, according to the present invention. Input/output unit 50 may include devices such as a keyboard, mouse, existing data including databases perhaps loadable from diskette(s) or removable persistent storage having larger capacity. Output in FIG. 2 may be provided via printers, monitors, removable or non-removable storage devices, among other media. A listing in C language for an exemplary routine 10 is provided herein as ATTACHMENT 1, although other routines to carry out part or all of the present invention may of course be otherwise implemented.

Figure 1:
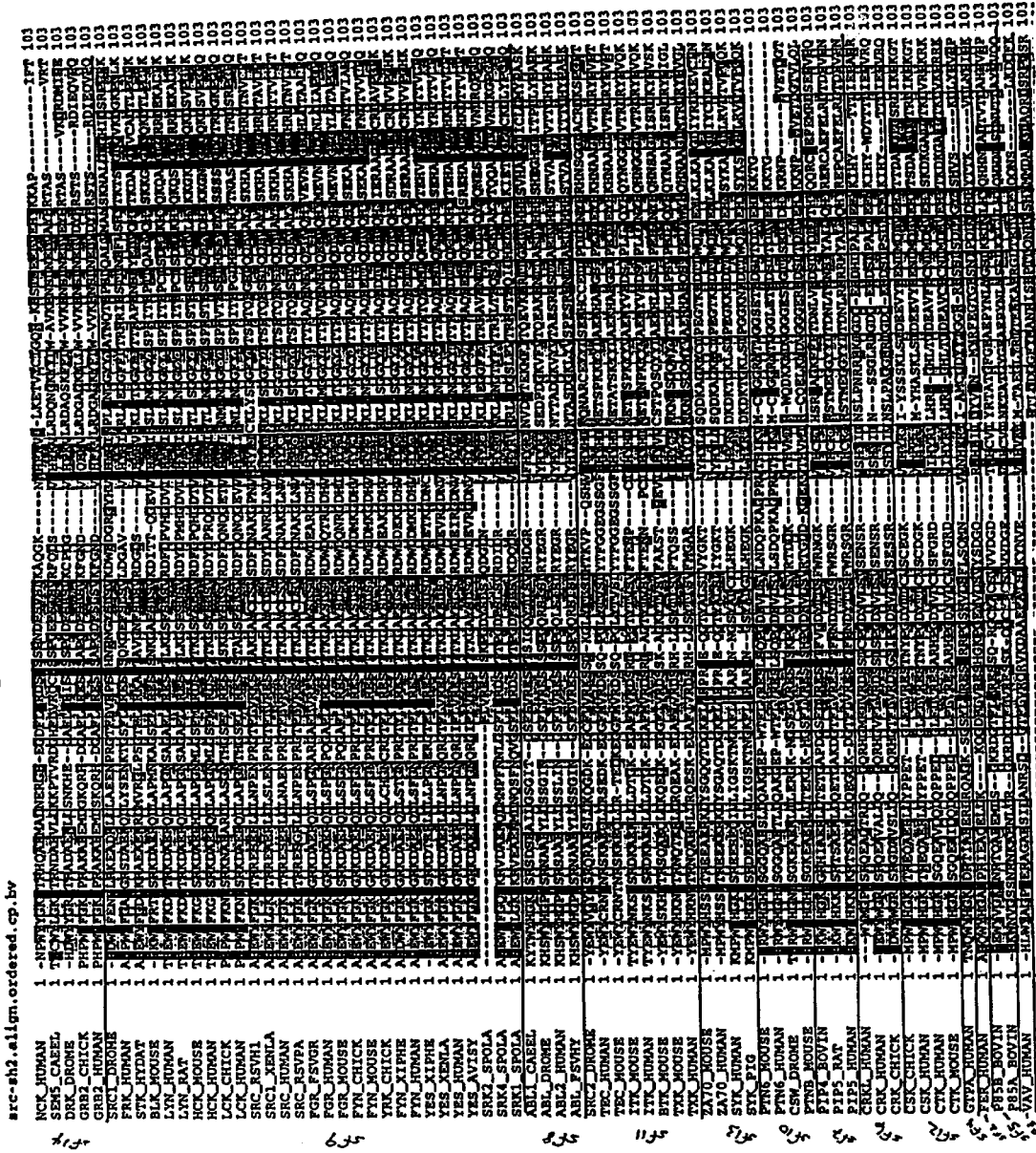
FIG. 1 is an exemplary multiple sequence alignment.
Figure 3:
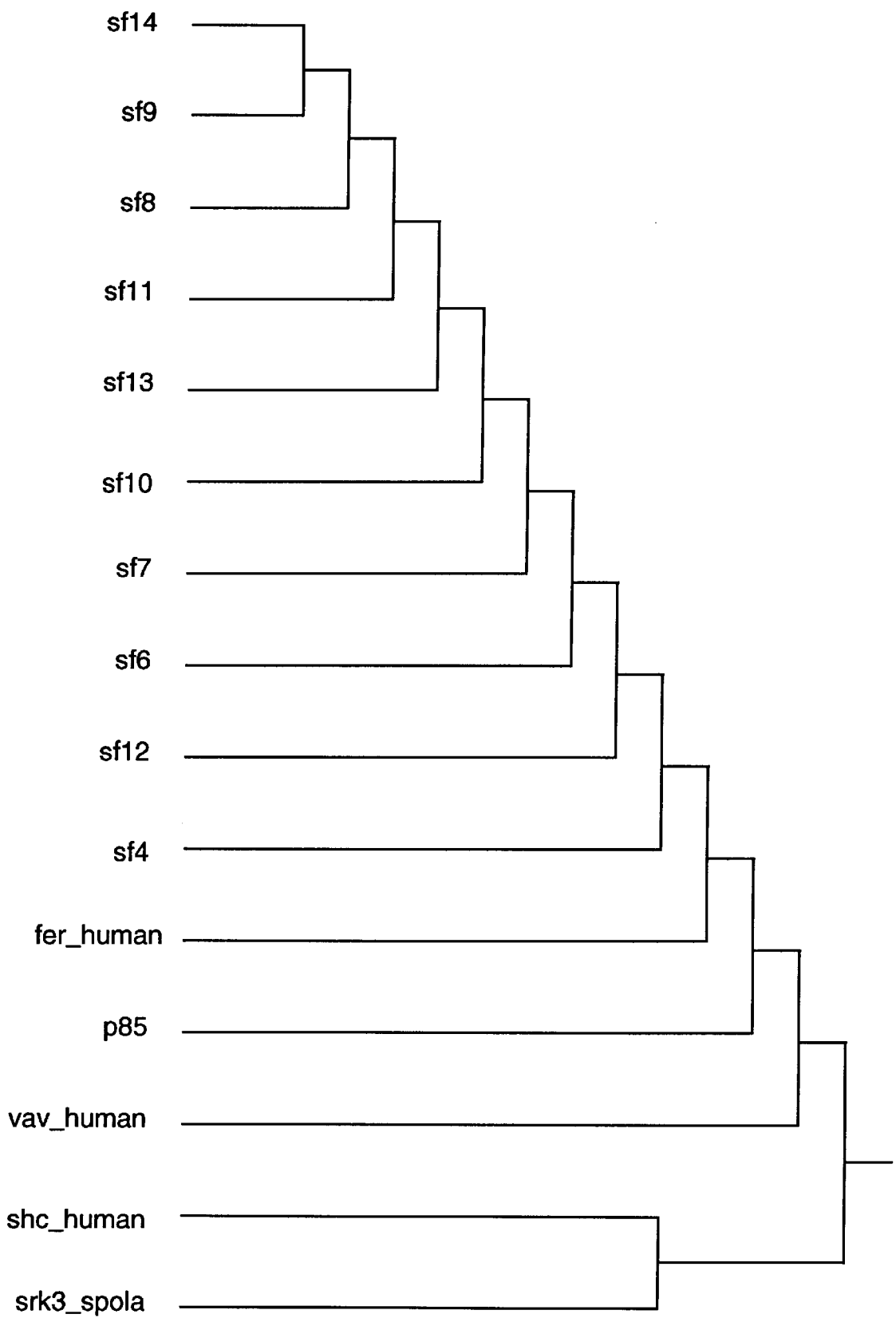
FIG. 3 is a portion of an exemplary phylogenetic tree for SH domain proteins for the MSA of FIG. 1, as generated by the present invention.

As described herein, various input data can be provided to system 10. When system 10 is used to output data that agglomeratively estimates a phylogenetic tree, the input data will be in the form of multiple sequence alignment data, for example arrayed data as shown in FIG. 1. If system 10 is used to output data identifying and creating cuts in a phylogenetic tree, input data will be data for an agglomeratively formed phylogenetic tree with measurable agglomeration encoding cost at every point. FIG. 3, for example, depicts an output portion of a phylogenetic tree for SH2 domain proteins. In some applications, system 10 will be used to output data in the form of statistical models, in which case input data will represent the decomposition of a phylogenetic tree into subtrees produced using encoding cost measurements. Other applications may require that system 10 output data providing a position-by-position analysis, in which case input data may include MSA data and subfamily decomposition data.

Those skilled in the art will appreciate the benefits afforded by the various output information that system 10 can provide. Without limitation, phylogenetic trees constructed according to the present information help elucidate functional and structural similarity for proteins under analysis. Statistical model output data is valuable in identifying remote homologs in database searches, an especially valuable tool for pharmaceutical companies. Output data that represents an alignment analysis of MSA data within the context of subfamily decomposition permits predicting residues that are important for the function of the protein in designing and tailoring new drugs. Such uses of the present invention in aiding DNA or protein sequence analysis, inferring function or structure, recognizing remote homologies in proteins, and factoring out contribution of subfamily relationships from mutual information between columns when attempting to infer contact potentials in proteins for threading algorithms are merely exemplary and are not intended to be limiting.

Having generally described a system by which the present invention may be carried out in automated fashion, an overview of the present invention will first be given, followed by a detailed description of the various method steps.

Protein families are classified by possession of a common fold and function, and within a protein family there may be significant local differences in structure or functional specificity. Accordingly, proteins that are similar in these differentiating regions are classified herein as belonging to the same protein subfamily. The recognition and use of such protein subfamily relationships is used by the present invention to promote improved sequence annotation. For example, differences in functional specificities of subfamilies, such as ability to bind different substrates, can be identified by columns in an alignment showing conserved residues within each subfamily, but different between subfamilies. Further, when functional information becomes available for certain proteins in an alignment, one may be able to attribute functional specificities of such proteins to other proteins in their subfamily.

Sequence weighting, according to the present invention, advantageously uses subfamily identities and conservation residues. Sequence weighting prevents highly populated subfamilies from dominating statistics of the profile, hidden Markov model ("HMM"), or other statistical subfamily model. HMMs can be constructed to identify sets of positions that describe the (more or less) conserved first-order structure in a set of sequences. In biological terms, this corresponds to identifying core elements of homologous molecules. HMMs can also provide additional information such as the probability of initiating an insertion at any position in the model, and the probability of extending it. The structure of an HMM is similar to that of a profile, with position-specific insert and delete probabilities. In constructing an HMM or profile for the subfamilies, information can be shared between subfamilies at positions where there is evidence of common structural constraints. But at the same time, the statistics are kept separate at positions showing evidence of different structural constraints. This procedure permits, for example, producing amino acid distributions for each subfamily that retain subfamily specificity, without sacrificing generalization capacity. HMMs are further described in detail in "Hidden Markov Models in Computational Biology", A. Krogh, et al., J. Mol. Biol. (1994) 235 pages 1501–1531, which reference is incorporated herein by reference.

The present invention preferably identifies protein subfamilies in a set of aligned proteins in two stages. First, a phylogenetic or sequence-similarity tree is constructed, preferably using agglomerative clustering and nearest-neighbor heuristics to infer subfamilies within an alignment. Initially each sequence is in its own class and forms a leaf of the tree, a leaf being a terminal (as contrasted with internal) node of a tree. At each iteration of the algorithm, the two closest classes are merged until at termination all sequences are within a single class that forms the root of the tree. At each iteration a profile is formed for each class. Profile formation is preferably carried out by combining a Dirichlet mixture prior over amino acid distributions with the observed amino acids at each position, to estimate expected amino acids at each position for homologs to the sequences in each class. Relative entropy may then be used to determine which two classes to merge at each step in the agglomeration. As described further herein, identification of subfamilies permits constructing statistical models having improved ability to produce multiple alignments and to recognize remote homologs.

Next, the tree may be cut into subtrees by determining the cut that will produce the minimum encoding cost of the data represented by the subtrees. Each cut of the tree into subtrees is equivalent to a partition of the sequences into subfamilies. Each cut also induces a different set of multiple alignments, one per subfamily. Encoding cost may be decomposed into the cost to encode each of the columns in the multiple alignments induced, and cost of encoding sequence labels to identify subfamily membership for each sequence.

The encoding cost of a random variable is inversely proportional to its probability. Thus, finding a partition that minimizes the encoding cost is equivalent to finding a partition that maximizes the probability of the data. Dirichlet mixture priors are densities on amino acid distributions. As such, they provide a Bayesian framework for assigning probabilities to combinations of amino acids observed in columns of multiple alignments. In practice, these priors are estimated on thousands of columns from protein alignments. The priors give high probability to conserved amino acids, as well as to commonly observed mixtures of similar amino acids. Because the encoding cost at each step of the agglomeration includes the cost of encoding sequence labels for subfamily identification, the encoding cost is minimized when the number of classes is fewest, and the columns induced by the partition for each class of sequence have mostly conserved or very similar amino acids.

Having broadly described analytical methods provided by the present invention, a more detailed explanation will now be given. The notation used in the following description is summarized as follows:

$|\vec{x}| = \Sigma_i x_i$ where $\vec{x}$ is any vector.

$\vec{n} = n_1, \ldots, n_{20}$ is a vector of counts from a column in a multiple alignment; the symbol $n_i$ refers to the number of amino acids $i$ in the column, the $t^{th}$ such observation in the data being denoted $\vec{n}_t$.

$\vec{n}_{c,s}$ is the count vector summarizing the observed counts in column c of subfamily s.

$\vec{p} = (p_1, \ldots, p_{20})$, $\Sigma p_i = 1$, $p_i \geq 0$, where $p_i$ is the probability of amino acid $i$, are the parameters of the multinomial distributions from which the $\vec{n}$ are drawn.

p is the set of all such $\vec{p}$.

$\hat{p}_{i,c,s}$ is the expected probability of amino acid i in column c for subfamily s.

$\vec{\alpha} = (\alpha_1, \ldots, \alpha_{20})$ s.t. $\alpha_i > 0$, are the parameters of a Dirichlet density. The parameters of the $j^{th}$ component of a Dirichlet mixture are denoted $\vec{\alpha}_j$, and the symbol $\vec{\alpha}_{j,i}$ refers to the $i^{th}$ parameter of the $j^{th}$ component of a mixture.

$q_j = \mathrm{Prob}(\vec{\alpha}_j)$ is the mixture coefficient of the $j^{th}$ component of a mixture.

$\theta = (q_1, \ldots, q_L, \vec{\alpha}_1, \ldots, \vec{\alpha}_L)$ = all the parameters of the Dirichlet mixture.

L = the number of components in a mixture.

A partition on the sequences in the alignment is a division of the sequences into separate non-overlapping subsets, or equivalence classes. If the partition divides the sequences into sets having close phylogenetic relationships within each set, then the equivalence classes identified correspond roughly to the biological subfamilies in the set.

Assuming N sequences in the alignment, the following notation will permit shorthand reference to the two trivial partitions:

$P_N$ is the partition with every sequence in its own class (biologically appropriate when there is no phylogenetic relationship between the sequences); and $P_1$ is the partition with every sequence in the same class (biologically appropriate when the sequences in the alignment have a high level of primary sequence identity).

In the notation used, subscripts indicate the number of non-empty equivalence classes under the partition.

$$D(p \| q) = \sum_x p(x) \log \frac{p(x)}{q(x)}$$

is the relative entropy (also known as

Kullback Leibler distance) between two distributions p and q. Relative entropy is a measure of the increase in encoding cost to encode a random variable having distribution p if one uses an encoding scheme designed for a random variable with distribution q. (See Thomas M. Cover and Joy A. Thomas. Elements of Information Theory. John Wiley and Sons, first edition, 1991.)

$\mathrm{TRE} = \Sigma_c D(i_c \| j_c) + D(j_c \| i_c)$, where $i_c$ and $j_c$ are the probability distributions at position c in the profile for the $i^{th}$ and $j^{th}$ subfamilies respectively, is the symmetrized Total Relative Entropy, between the two subfamilies.

Having defined the notation used herein, the alignment encoding will now be described. The total cost (in bits) to encode an alignment of N sequences and K subfamilies, using Dirichlet mixtures, is $$N \log_2 K - \sum_{c,s} \log \mathrm{Prob}(\vec{n}_{c,s} \mid \theta, |\vec{n}_{c,s}|) \qquad (1)$$

This quantity can be broken down into encoding sequence labels (or $N \log_2 K$), and encoding count vectors induced by the partition costs (e.g., the remainder of equation (1)).

The cost to encode sequence labels = $N \log_2 K$ bits, which is the maximum cost to specify to which of the subfamilies (or equivalence classes) a particular sequence belongs. If there are K subfamilies in the alignment, it requires at most $\log_2 K$ bits to encode the subfamily label for each sequence. Thus, if there are N sequences, the total cost for these sequence labels is $\Sigma \log_2 K = N \log_2 K$ bits. The fewer the number of subfamilies, the cheaper it is to encode these labels, e.g., when K=1, encoding the sequence labels requires 0 bits.

Encoding the count vectors induced by the partition costs =

$$-\sum_{c,s} \log \mathrm{Prob}(\vec{n}_{c,s} \mid \theta, |\vec{n}_{c,s}|).$$

Since the encoding cost of the count vectors is inversely related to the probability of the observed counts, the lowest encoding cost for the count will occur when the partition of the sequences creates count vectors that are similar to count vectors used to train the mixture. Training data for these mixtures came from alignments of fairly close homologs (HSSP alignments and the BLOCKS database); thus pure distributions and amino acids that have similar physicochemical characteristics (such as I,L and V, or A,S and T) will have high probability, and correspondingly low encoding cost. (Standard one-letter symbols are used herein to denote specific amino acids, e.g., I denotes Isoleucine, L Leucine, and so forth.)

The two costs to encode the alignment balance each other: the first cost seeks to minimize the number of subfamilies, while the second cost seeks to have as many pure count vectors as possible.

A preferred algorithmic procedure for tree constructing a optimal cut location such that sequences may be partitioned into subfamilies will now be described. With reference to FIG. 1, a computer program for carrying out the procedure may be stored or loaded into memory for execution by a central processor unit within a computer system.

Procedurally, partitioning sequences into subfamilies may be carried out in the following steps:

(1) The encoding cost of the count vectors induced by the trivial partition $P_1$ is computed. Since K=1, there is no cost for encoding the sequence labels. The total cost therefore is simply the sum over all columns in the alignment of the negative log of the probability of the counts in each column under the Dirichlet mixture, or $$-\Sigma_{c,s} \log \text{Prob}(\vec{n}_{c,s}|\theta, |\vec{n}_{c,s}|)$$

(2) The initial partition is set to be $P_N$ (each sequence is in its own equivalence class);

(3) A profile is created for each equivalence class, preferably by obtaining a posterior estimate over the amino acids at each position by combining observed counts with a Dirichlet mixture $\Theta$.

(4) While the number of classes in the partition is greater than 1, carry out the following steps:
  (a) Compute total relative entropy (TRE) between every pair of profiles;
  (b) Find the pair giving the lowest TRE;
  (c) Replace these two classes with a single class that combines the counts at each position, thus reducing the number of classes in the partition by 1;
  (d) Create a profile of the expected amino acids at each position for the new class using the counts from each of the classes merged, combined with a Dirichlet mixture prior;
  (e) Report encoding cost of the count vectors under the new partition, and the difference in encoding cost per residue from the encoding cost under the trivial partition $P_1$;

(5) Find the partition giving the greatest savings in encoding cost relative to $P_1$;

Having thus identified subfamilies, subfamily identities may be incorporated into a statistical model construction. Consider the computation of expected amino acids, given a single subfamily in an alignment. When a single subfamily exists in an alignment of proteins, one can assume that the distribution of amino acids in each column may be modeled using the following generative stochastic process, which process may of course be carried out by a computer system such as shown in FIG. 2.

(1) First, a component j from the mixture $\Theta$ is chosen at random according to the mixture coefficient $q_j$;

(2) Next a probability distribution $\vec{p}$ is chosen independently according to Prob($\vec{p}|\vec{\alpha}_j$), the probability defined by component j over all such distributions.

(3) Finally, the observed amino acids are generated independently according to the distribution $\vec{p}$. Thus, the count vector $\vec{n}$ summarizing the observed amino acids in a column will be distributed according to the multinominal distribution with parameters $\vec{p}$.

The above relationships permit defining the estimated probability of amino acid i, $\hat{p}_i$, given a Dirichlet density with parameters $\Theta$ and observed amino acids counts $\vec{n}$, as follows:

$$\hat{p}_i := \text{Prob}(\text{amino acid } i|\theta, \vec{n}) \quad (2)$$

$$= \int_{\vec{p}} \text{Prob}(\text{amino acid } i|\vec{p}) \text{Prob}(\vec{p}|\theta, \vec{n}) d\vec{p} \quad (3)$$

In equation (3), the first term in the integral, Prob(amino acid $i|\vec{p}$), is simply $p_i$, the $i^{th}$ element of the distribution vector $\vec{p}$. The second term, Prob($\vec{p}|\Theta, \vec{n}$), represents the posterior probability of the distribution $\vec{p}$ under the Dirichlet density with parameters $\Theta$, given that amino acid counts $\vec{n}$ were observed. The integral represents the weighted predictions of the probability of amino acid i from each probability disribution $\vec{p}$, where the weight for each $\vec{p}$ is the posterior probability of $\vec{p}$ given the observed amino acids, under the Dirichlet mixture with parameters $\theta$. An estimate of this type is often termed a mean posterior estimate.

Equations (2) and (3) may be manipulated to yield the final form shown in equation (4):

$$\hat{p}_i := \sum_{j=1}^{l} \text{Prob}(\vec{\alpha}_j|\vec{n}, \theta) \frac{n_i + \alpha_{j,i}}{|\vec{n}| + |\vec{\alpha}_j|} \quad (4)$$

Thus, instead of identifying one single component of the mixture that accounts for the observed data, a determination is instead made as to how likely each individual component is to have produced the data. Then, each component contributes pseudocounts proportional to the posterior probability that it produced the observed counts. This probability may be calculated using Bayes' Rule:

$$\text{Prob}(\vec{\alpha}_j|\vec{n}, \theta) = \frac{q_j \text{Prob}(\vec{n}|\vec{\alpha}_j, |\vec{n}|)}{\text{Prob}(\vec{n}|\theta, |\vec{n}|)} \quad (5)$$

In equation (5), Prob($\vec{n}|\vec{\alpha}_j, |\vec{n}|$) is the probability of the count vector n given the $j^{-th}$ component of the mixture. A derivation may be found in K. Sjölander, K. Karplus, M. P. Brown, R. Hughey, A. Krogh, I. S. Mian, and D. Haussler. Dirichlet mixtures: A method for improving detection of weak but significant protein sequence homology. *CADIOS*, 12(4):327–345, 1996. This publication is incorporated herein by reference.

In equation (5), the denominator, Prob (n|$\theta$, |n|), is defined by equation (6):

$$\text{Prob}(\vec{n}|\theta, |\vec{n}|) = \sum_{k=1}^{l} q_k \text{Prob}(\vec{n}|\vec{\alpha}_k, |\vec{n}|) \quad (6)$$

Computation of the expected amino acids given multiple subfamilies in an alignment will now be described. When more than one subfamily exists in an alignment of proteins, the generative stochastic process underlying the observed amino acids in each column is different. In particular, two cases are to be considered: (I) each subfamily may be subject to different environmental constraints at a position, or (ii) all subfamilies are subject to the same environmental constraints at a position.

Whether different subfamilies families have different or similar environmental constraints can be determined by comparing the encoding cost of the amino acids observed in the subfamilies under these two assumptions.

Consider now the stochastic process underlying amino acid distributions given similar environmental constraints. If the constraints are similar, one assumes that the distribution of amino acids in each column can be modeled by the following generative stochastic process:

(1) First, the subfamilies jointly choose a component j from the mixture θ at random according to the mixture coefficient $q_j$;

(2) Then each subfamily independently chooses a probability distribution p according to Prob ($p|a_j$), the probability defined by component j over all such distributions;

(3) Finally, the observed amino acids are generated independently for each subfamily according to the distribution p. Thus, the count vector $n_{c,s}$ summarizing the observed amino acids in column c for subfamily s will be distributed according to the multinominal distribution with parameters p.

Thus, in this case, denoted "tied alphas", the amino acids in each subfamily at positions having similar structural environmentals are constrained to be somewhat similar to each other.

Given the observed counts in each subfamily, one may compute the expected amino acids at position c for homologs to a particular subfamily s by the following formula:

$$\hat{p}_{i,c,s} := \sum_{j=1}^{1} \text{Prob}(\vec{\alpha}_j | \vec{n}_{c,1}\ldots,\vec{n}_{c,s},\theta)\frac{n_{c,s,i}+\alpha_{j,i}}{|\vec{n}_{c,s}|+|\vec{\alpha}_j|} \quad (7)$$

In the above equation, Prob $(\vec{\alpha}_j | \vec{n}_{c,1} \ldots \vec{n}_{c,s}, \theta)$ is defined by Bayes' Rule to be:

$$\text{Prob}(\vec{\alpha}_j | \vec{n}_{c,1}\ldots,\vec{n}_{c,s},\theta) = \frac{q_j \prod_{s=1}^{S}\text{Prob}(\vec{n}_{c,s}|\vec{\alpha}_j,|\vec{n}_{c,s}|)}{\sum_{k=1}^{1} q_k \prod_{s=1}^{S}\text{Prob}(\vec{n}_{c,s}|\vec{\alpha}_k,|\vec{n}_{c,s}|)} \quad (8)$$

where S=the number of subfamilies in the data. In equation (8), the formula for Prob ($n_s|\alpha_j, |n, |$) may be found in K. Sjölander, K. Karplus, M. P. Brown, R. Hughey, A. Krogh, I. S. Mian, and D. Haussler. Dirichlet mixtures: A method for improving detection of weak but significant protein sequence homology. *CABIOS*, 12 (4):327–345, 1996, which publication is incorporated herein by reference.

Consider now the stochastic process underlying amino acid distributions given different environmental constraints. If the environmental constraints are different from one subfamily to the next, one assumes that one may assume that the distribution of amino acids in each column can be modeled by the following generative stochastic process:

(1) First, each subfamily choose a component j from the mixture θ independently at random according to the mixture coefficient $q_j$;

(2) Then each subfamily independently chooses a probability distribution p according to Prob ($p|\alpha_j$), the probability defined by component j over all such distributions;

(3) Finally, the observed amino acids are generated independently for each subfamily according to the distribution p;

Thus, in this case, denoted herein as "untied alphas", the amino acids are generated in each subfamily entirely independently of each other, and the formula for computing the expected amino acids at position c for subfamily s reduces to the following equation:

$$\hat{p}_{i,c,s} := \sum_{j=1}^{1} \text{Prob}(\vec{\alpha}_j|\vec{n}_{c,s},\theta)\frac{n_{c,s,i}+\alpha_{j,i}}{|\vec{n}_{c,s}|+|\vec{\alpha}_j|} \quad (9)$$

In this case, prob ($\alpha_j|n_{c,s}, \theta$) is defined as in equation (5).

More generally, weighted counts from other subfamilies may be included when computing the posterior probabilities over the amino acids. In this case, the fraction, $$\frac{n_{c,s,i}+\alpha_{j,i}}{|\vec{n}_{c,s}|+|\vec{\alpha}_j|}$$

may be replaced with the fraction $$\frac{\omega(n_{c,s,i})+\alpha_{j,i}}{|\omega(\vec{n}_{c,s})|+|\vec{\alpha}_j|}$$

where $\omega(n_{c,s})$ represents the weighted sum over all subfamilies of amino acid i at column c for subfamily s, and $|\omega(n_{c,s})|$ represents the total weighted counts at that position computed for subfamily s. In this arena, when computing the weighted counts for subfamily s at position c, flexibility exists. Counts may be added in uniformly from each subfamily s', s'≠s; counts may be added proportional to the distance between the subfamilies, for example, as measured by the TRE; no counts may be added in from other subfamilies; other variants are easily imaginable.

Figures 4A, 4B, 4C:
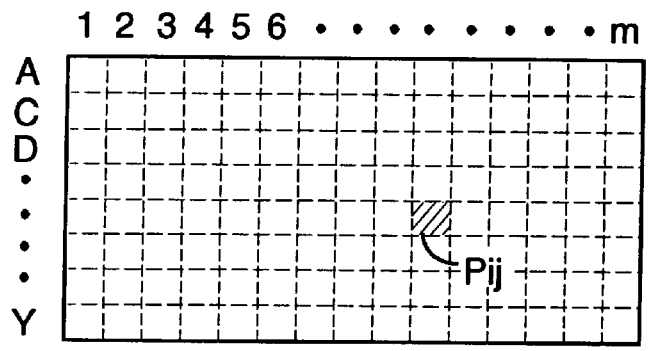
FIG. 4A is a profile for sequences in a multiple sequence alignment, where $P_{ij}$ is probability of residue i at position j in the MSA.
FIG. 4B depicts a single column from a multiple sequence alignment of protein sequences.
FIG. 4C depicts transformation of a column such as shown in FIG. 4A into a probability distribution.

FIG. 4A is a profile for sequences in a multiple sequence alignment such as shown in FIG. 1. As noted, in using MSA data, the assumption is that the amino acids shown evolved from one common ancestor. Further, one assumes that a series of mutation events resulted in some amino acids changing, and in some amino acids being generated, e.g., between adjacent amino acids in a sequence. In other instances, an amino acid may be entirely deleted from the ancestor sequence in some of the descendants.

In FIG. 4A, $P_{ij}$ denotes the probability of residue i at position j in the MSA, while FIG. 4B depicts a single column from an MSA of protein sequences, e.g., that shown in FIG. 1. In FIG. 4B, sequences are listed vertically with single letter abbreviations for amino acids shown, where indicated.

The present invention takes all of the amino acids observed in an MSA column (e.g., a column such as FIG. 4B) and transforms the information into a profile over all the amino acids that are expected in other sequences for matching at that position. In FIG. 4B, sequence 1 represents one position in a protein, where in this example there is found aspartic acid, abbreviated D. Proteins of course may have many hundreds of amino acids, but some positions in an MSA may have no amino acid. Thus in FIG. 4B, sequence 3 does not align any amino acid in that position, the absence being filled by the indel character "−". The column shown in FIG. 4B is arbitrary but it has a fixed identify and does not change from one sequence to the next.

A column such as shown in FIG. 4B is transformed by system 10 into a probability distribution, such as shown in FIG. 4C, in which there is shown amino acid abbreviations and an associated probability distribution. The first entry, alanine (A), has a probability distribution of 0.01, and every position in a profile is a column that has a probability distribution over all the amino acids. Thus the sum of all the probabilities in FIG. 4C adds up to one.

Figure 5:
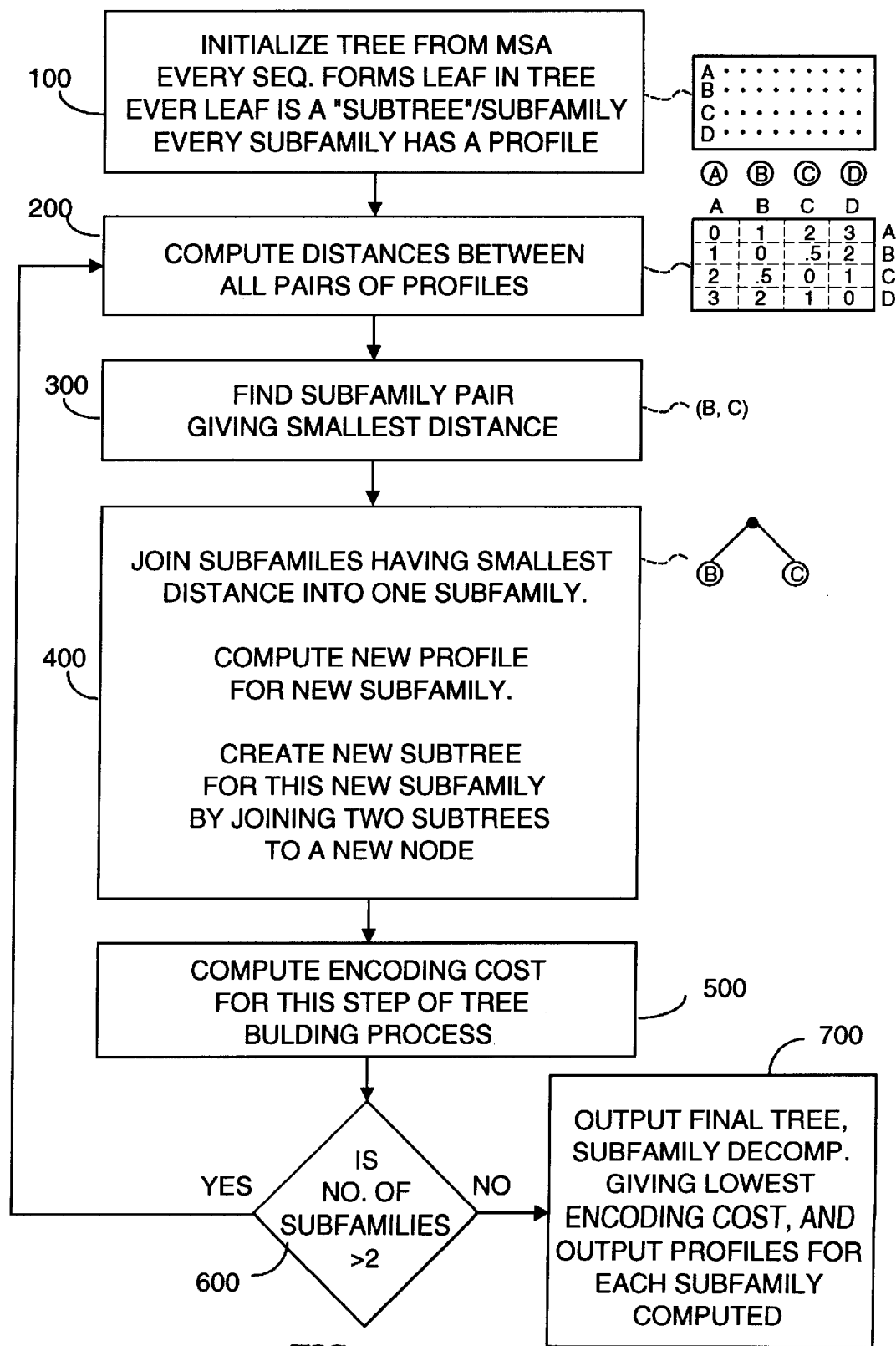
FIG. 5 is a simplified flowchart depicting steps preferably used to carry out the present invention.

FIG. 5 is a simplified flowchart depicting steps preferably used to carry out the present invention. As noted, the present invention may be practiced by computer system 10 automatically executing routine 40 to operate upon input data. For example, the present invention seeks to fill in the entire tree topography using MSA information.

Briefly, applicant's tree formation infers subfamilies in protein sequence data protein may fairly be described as using a hierarchical clustering paradigm known as agglomerative clustering using nearest neighbor heuristics. Initially, each sequence is in its own class, and forms a leaf of the tree. At each iteration of the algorithm or procedure, the two closest classes are merged, until at termination all sequences are in a single class, forming the root of the tree.

Each stage of the agglomerative algorithm defines a distinct partition of the tree into subtrees, which defines a partition of the sequences into subfamilies. Each such partition induces a different set of multiple alignments, one for each subfamily. As classes are merged, the observed amino acid counts at each position are combined, and a profile of expected amino acids for each position in the multiple alignment for the class is created. These profiles are computed by combining the total observed amino acids in the class at each position, weighted appropriately with a Dirichlet mixture prior over prototypical amino acid distributions.

As used herein, Dirichlet mixture priors are densities on amino acid distributions, and provide a Bayesian framework for assigning probabilities to combinations of amino acids observed in columns of multiple alignments. These priors are estimated on thousands of columns from protein alignments, and give high probability to conserved amino acids, as well as to commonly observed mixtures of similar amino acids. Especially useful comutational procedures found in K. Sjölander, K. Karplus, M. P. Brown, R. Hughey, A. Krogh, I. S. Mian, and D. Haussler. Dirichlet mixtures: A method for improving detection of weak but significant protein sequence homology. *CABIOS*, 12 (4):327–345, 1996, and in M. P. Brown, R. Hughey, A. Krogh, I. S. Mian, K. Sjölander, and D. Haussler. using Dirichlet mixture priors to derive hidden Markov models for protein families. In L. Hunter, D. Searls, and J. Shavlik, editors, *ISMB-93*, pages 47–55, Menlo Park, Calif., July 1993. AAAI/MIT Press.

In FIG. 5, at step 100, a tree is initialized from the MSA input data, and every protein is made a leaf. Each protein has an associated sequence ID, i.e., the sequence name associated with every row of the MSA. Every row of the MSA corresponds to an amino acid sequence with dashes or dots inserted to make the row align properly, from some protein that has a name. Shown logically attached to the right of step 100 is an MSA with identifiers A, B, C, D for the sequences (e.g, proteins) in the MSA in this case. If the MSA contained a number of sequences equal to X, there would be X separate subtrees at step 100, one subtree per profile per sequence.

Every protein having a name in the MSA is turned into a leaf in the tree. In the example shown in FIG. 4, sequences A, B, C, D are initially unconnected separate leafs, denoted by circled letters A, B, C, and D, with no interconnections. In step 100, using equation (4) a profile is created for every subfamily, preferably using Dirichlet mixture densities to form posterior estimates of the amino acids at every position. Stated differently, every amino acid in the first sequence is used. Every position with a single observed amino acid is converted into a distribution over all the amino acids, column-by-column, to produce a sequence profile such as shown in FIG. 4A.

It will be appreciated that when Dirichlet mixtures or other pseudo count methods are used, relative weights and weight magnitude are both important. This is because the formula for computing expected amino acid distributions gives the prior more influence on the estimate when little data is available, but as available data increase, the observed frequencies dominate the posterior estimate.

Applicant's methodology is unusual in its use of relative entropy, equation TRE, as a distance metric. At step 200 in FIG. 5, distances are computed by computer system 10 between all pairs of profiles using TRE. In step 200, the distance metric used to determine the two classes to merge at each step is defined to be the sum over all columns in the alignment of the symmetrized relative entropy between the distributions at each position. Each partition of the sequences also has an associated encoding cost: the cost to encode each column in each alignment, as well as the sequence labels identifying subfamily membership for each protein.

The encoding cost of each step of the agglomeration includes the cost of encoding sequence labels for subfamily identification. Thus, the encoding cost is minimized when the number of classes is fewest, and the columns induced by the partition for each class of sequences have mostly conserved or very similar amino acids. At termination, that partition of the sequences that yields the minimum encoding cost defines the cut of the tree into subtrees. Since the encoding cost of the data is inversely proportional to the probability of the data, finding a partition that minimizes the encoding cost is equivalent to finding a partition that maximizes the probability of the data.

Shown logically to the right of step 200 is a logic matrix with distances indicated therein. At step 300, the relative entropy determined distances are compared for subfamily pairs, and in this simple example, subfamilies B and C are determined to have the smallest distance (e.g., 0.5 in the simple distance matrix).

At step 400, it is now known to connect leaf B and leaf C (which hitherto have been unconnected) to a common node, which joining is shown logically to the right of step 400. This common node joining implies that B and C share a common ancestor, a fact not self-evident from the raw MSA input data.

Step 400 computes new profiles for the new subfamilies that are created, and creates a new subtree for each new subfamily by joining two new subtrees to a new node.

At step 500, the encoding cost is computed for this step of the tree building process, and at step 600 a test determines whether the final tree has now been constructed, or whether to return the process to step 200 to continue to join subtrees.

Eventually step 600 passes the routine to step 700, and a final tree is output by computer system 10. The subfamily decomposition associated with the lowest encoding cost is known, and output profiles for each subfamily are also provided.

The general process shown in FIG. 5 can provide various output data. At every point in the tree-forming agglomeration process, the encoding cost is measurable. Thus, the present invention can determine which point in the agglomeration provides the minimum encoding costs, e.g., as defined using Dirichlet mixture densities to assign probabilities to amino acids within each subfamily at each position. The specific Dirichlet mixture formulas set forth herein compute encoding costs under the hypothesis that each subfamily chooses similar distributions or dissimilar distributions. More particularly, Dirichlet mixture formulae are provided for a first hypothesis in which subfamily members are constrained to chose the same components of the Dirichlet density at a particular position in the MSA. Dirichlet mixture formulae are also provided for a second hypothesis in which subfamily members are not unconstrained with respect to Dirichlet density component choices. Measurements are made under both hypotheses and the selection is made from whichever provides the minimum encoding cost.

Given a decomposition of a phylogenetic tree into subtrees produced using encoding cost measurements, statistical models may be constructed for each subfamily. The statistical models are created in a position-dependent manner by measuring at every position whether all subfamilies having chosen the same component of the Dirichlet density or have chosen different components of the Dirichlet density. The statistical models preferably are created using the estimated independent counts at each position within each subfamily.

Given a subfamily decomposition, the present invention provides a position-by-position analysis of the MSA. Within each subfamily, the average conservation across the subfamilies at each position is computed. The conservation type, e.g., general or subfamily-specific, is identified. Positions that show variable physico-chemical constraints among the amino acid subfamilies are identified, for example using Bayesian techniques.

The present invention thus creates a phylogenetic tree, provides statistical models for every subfamily, and provides an analysis of the MSA within the context of the subfamily decomposition. Those skilled in the art will appreciate that such information provided assists in a homolog identification, and in identifying key residues in the alignment analysis.

The phylogenetic tree output helps elucidate functional similarity or evolutionary history among the proteins being analyzed. The phylogenetic tree output also helps identify proteins that are likely to have similar functions. Such output data is valuable, for example, to pharmaceutical companies seeking to predict the efficacy of new drugs. The statistical models, which may be in the form of profiles or HMMs, are useful in identifying remote homologs in database search, e.g., for determining regions of homology between proteins. The alignment analysis is useful in helping pharmaceutical companies predict residues that are important for the function of a protein in designing new drugs.

The present invention may be practiced in many ways, depending upon the desired result. For example, one may process input MSA data to yield a classification of the sequences in an alignment into subfamilies. Use of a routine, e.g., program 40 in FIG. 2 (exemplified by ATTACHMENT 1), may be simple and command-line driven, requiring the existence of an alignment, and setting some parameters if the user wishes to override default settings. Computer system 10 would output a file containing the phylogenetic tree constructed, information on the similarity between sequences and between subfamilies, encoding cost savings, and so on, as well as individual HMMs for each subfamily identified.

If the invention is employed for active site identification, positions contributing to functional specificity of subfamilies can be identified by noting those columns which are conserved within each subfamily, but that differ from one subfamily to the next. Such conserved columns within a subfamily are especially significant if there is overall a high level of variance between sequences within a subfamily. If the residue identity within a subfamily is high, most columns appear conserved and apparently conserved columns are much less significant. Certain residues are much more likely to be active site residues than others, and this information should also be taken into account when making such a determination. Of course active site residues that are conserved across all subfamilies can be identified without using subfamily identification, e.g., using standard sequence analysis tools.

Improved alignments can be obtained from a preliminary alignment that is somewhat rough, using a method for estimating an HMM from a set of homologous proteins spanning different (sub) families. The final alignment produced should have improved accuracy, especially in regions corresponding to different structural environments between subfamilies. Details of such a method are set forth later herein.

When using the present invention in sequence weighting applications, subfamilies in the data are first identified. Then, given a partition of the sequences into subfamilies, relative weights are assigned to each sequence within each subfamily, using any sequence weighting scheme desired. Finally, the total weight desired for each subfamily is chosen; and each of the sequences is multiplied by the constant necessary so that the sum of the relative weights within a subfamily is the total weight desired. This weighting approach can be used to create a statistical model for the family as a whole. Such model does not favor any individual subfamily over another, and advantageously prevents highly populated subfamilies from dominating the statistics of the model. One advantage of such data pre-processing is that outliers in the data can be tested to determine whether or not they are truly homologous to the other sequences in the data. Unless such spurious inclusions in the sequence set are identified, sequence weighting schemes that blindly assign high weights to outliers can result in statistical models that are very poor representations of the true underlying statistics in a family. This method gives us a means of avoiding such problematic cases.

FIG. 6A presents key functional residues identified by Waksman using a prior art mutation experimental technique. In FIG. 6B, binding pocket residues identified by Lichtarge method C2 and E1 are shown, as are binding pocket residues identified by a Bayesian method, according to the present invention. As is seen, applicant's Bayesian method correlates well to the Lichtarge methods.

Those skilled in the art will appreciate that the presently preferred methods of practicing the invention may be varied. The algorithm for finding the optimal cut of the phylogenetic tree into subtrees involves computing the cost to encode sequence labels. The quantity currently assigned for this cost is an upper bound, and may be too high and applicant continues to explore ways to compute a tighter bound on this quantity. The algorithm for constructing the phylogenetic tree constructs profiles with expected amino acid distributions for each subfamily at each position in the protein at each stage of the tree construction process. The formula for computing the expected amino acid distributions is influenced strongly by any weighting scheme on the sequences in the alignment, with respect to both relative and absolute weights. However to ensure good results in skewed data sets, it may be desired to use a weighting scheme that offsets the effects of the presence of many similar sequences in an alignment. The effects of including weighted counts from other subfamilies when computing posterior distributions over the amino acids should be examined. Other than including no counts from other subfamilies, one may allow all other subfamilies to contribute a fixed amount, distributed among the other subfamilies uniformly. Another and perhaps more effective alternative, would be to add in counts from other subfamilies proportional to the probability of that other subfamily given the subfamily whose amino acid distributions are being estimated. This would allow more similar subfamilies to contribute more strongly than more dissimilar subfamilies.

Many advantages and improvements provided by the present invention over prior art practices will by now be appreciated. A first advantage is that automatic inference of subfamilies in an alignment, given no prior information may be realized. Such methodology provides a formal statistical framework for inferring subfamilies in an alignment, which prior art methods cannot provide. Dirichlet mixture densities provide an especially valuable tool in both constructing and cutting the phylogenetic tree. Such densities have been shown to be the most effective method of estimating the expected amino acids in profiles for remote homolog recognition.

The present invention advantageously provides a formal statistical framework to infer which positions in a protein correspond to differing structural requirements between subfamilies. As a result, statistical models for each subfamily that retain specificity without sacrificing generalization capacity may be constructed.

The present invention also can improve alignment quality using subfamily relationships. By identifying subfamily relationships in a set of proteins, one can influence proteins within a subfamily to make similar paths through a HMM, while maintaining the mutual alignment between the subfamilies.

Detailed descriptions of automated methods to incorporate subfamily identities into HMMs built to recognize remote homologs will now be described with respect to three primary ways to recognize remote homologs using subfamily modeling.

In a first approach, if a Dirichlet mixture density is employed over the expected amino acid distributions found in structural alignments of remote homologs, the present invention provides an immediate test of whether two families are remote homologs. One need only measure the encoding cost of all columns in the multiple alignment of the two families (under the assumption that all the sequences belong to one super-family) and compare this cost to the encoding cost under the assumption that the sequences belong to different families.

A second approach seeks to find remote homologs to a set of proteins already identified as sharing a common fold. Within reason, the larger the divergence among the proteins in the set, the more effective this method likely will be. However, when the sequences are divergent in primary sequence, additional information will likely be needed to guide the multiple alignment of the proteins. To this end, structural alignments, such as those in the FSSP database are often the starting point. One can take a group of sequences that have been aligned using knowledge of the three-dimensional structure. A structural alignment of all the known proteins sharing a common fold reveals required residues defining the common function or structure of all the proteins sharing the fold, conservation patterns in different regions of the molecule, and allowable substitutions. The present invention effectively incorporates information contained in these structural alignments into statistical models for the fold family.

It is noted that absent means for obtaining amino acid probabilities at each position that reflect both the common fold and family specificity, a produced statistical model will be either too specific or too general to effectively recognize remote homologs. If the subfamilies are kept entirely separate, and a statistical model is built for each subfamily using only the sequences belonging to the subfamily, each subfamily model will be too specific, and information that defines the common fold will be lost. For instance, in an alignment of several families sharing a common fold there may be very few positions that are entirely conserved, while most columns reveal very different amino acid preferences between the families. For this super-family as a whole, the conserved columns have the greatest information content, while the remaining columns define the functional and structural specificity of each family separately. In database search for remote homologs to the families in the set, particular concern is directed to how putative homologs align at these conserved columns.

With respect to this second approach, methods for constructing a statistical model that discretely partition the sequences and ignore the information among the other members of the fold family are unable to distinguish these important positions defining the super-family. Each individual family will have many conserved positions. However, the overall importance of each of these positions in a as-yet unidentified remote homolog cannot be ascertained without considering the examples of identified remote homologs.

On the other hand, if a statistical model ignores the presence of distinct (sub) families in a structural alignment of remote homologs, the resulting amino acid distributions in most positions of the model will tend to be fairly close to the background frequency of amino acids. Only those positions that are conserved, or for which most (sub) families in the alignment have similar residues, will have any real information content over the background distribution. Such models have difficulty discriminating true homologs from false, due to low information content overall.

But the presently claimed methodology permits treating each family in the alignment as a distinct subfamily, and constructing a hidden Markov model or profile for each (sub)family that shares information at positions defining the is common fold. The presently claimed methodology keeps information separate at positions that contribute to the specificity of each family separately. By incorporating information defining the common fold, HMMs can be produced that have greater generality without losing specificity for the particular (sub)family. These HMMs generally tend to yield fewer false positives and false negatives in database discrimination.

A third approach for remote homolog recognition permits testing whether two or more families are homologous by attempting to build a joint model for all the proteins as a whole. The underlying assumption is that if all proteins in the set share a common fold, a statistical model should be constructable that gives high probability to all the proteins jointly.

Various ways may be used in building a joint model for the sequences belonging to the different families. In effect, these techniques involved constructing an HMM having separate data structures for storing the observed amino acids and transitions for each family, as well as separate probability distributions for amino acids and transitions. As each sequence aligns to the model, the amino acids that are aligned at each position, and the transitions taken, are added to the counts for that (sub)family. These observed counts are combined with priors over such events to compute the model parameters at every position for each (sub)family. Different formulas may be used according each position. As in typical HMM parameter estimation, the model parameters are estimated iteratively, based on repeatedly aligning the sequences to the model and combining the observed counts with prior distributions, until convergence. By having separate but linked data structures for amino acid and transition probabilities, proteins may be constrained within each family to remain in register (i.e., aligned similarly to the joint model), but to maintain overall alignment quality among all the sequences jointly. The output of this joint model construction will be a set of HMMs, one for each (sub)family.

After the parameter estimation process has terminated, the validity of the hypothesis that the proteins are remote homologs may be tested in the following ways:

(a) The ability of the model(s) to produce high-quality multiple alignments is checked. Since each node in each of the individual (sub)family HMMs corresponds to a column in the joint alignment of the sequences, the separate alignment of each sequence to its own (sub) family HMM creates a multiple alignment of all the proteins. This alignment may be checked for validity by checking columns known to correspond to active site residues in any of the families. If the families in the alignment are true homologs, then active site residues in one family should correspond to active site residues in the other families. However, similar, rather than identical, residues may be substituted in the other families. One can also check whether the sequences within each (sub)family remain in register in the alignment.

(b) The discrimination ability of the joint model(s) produced is checked. Hidden Markov models assign probabilities to sequences. Thus, one can check whether the joint model(s) give high probabilities to all sequences used in training, and that sequences not used in training are given low probability (unless these sequences are in fact remote homologs to the training data). If the sequences used to train the model(s) are not truly homologous, the model parameters will have fairly general amino acid distributions at each position, and have difficulty giving high probability to any particular protein sequence, including those used in training.

The preferred use of Dirichlet mixtures with respect to carrying out the present invention will now be described in detail.

The present invention preferably uses Dirichlet mixtures to condense information in multiple alignments of proteins into a mixture of Dirichlet densities over amino acids. The Dirichlet mixture densities are designed to be combined with observed amino acid frequencies to form estimates of expected amino acid probabilities at each position in a profile, a hidden Markov model ("HHM"), or other statistical model. These estimates provide a statistical model with greater generalization capacity such that remotely related family members can be more reliably recognized by the model. An further detailed description of Dirichlet mixtures and such applications is found in K. Sjölander, K. Karplus, M. P. Brown, R. Hughey, A. Krogh, I. S. Mian, and D. Haussler. Dirichlet mixtures: A method for improving detection of weak but significant protein sequence homology. *CABIOS*, 12 (4):327–345, 1996, supra.

Modifications and variations may be made to the disclosed embodiments without departing from the subject and spirit of the invention as defined by the following claims.

What is claimed is:

1. A system for agglomeratively estimating a phylogenetic tree for proteins from input data arrayed to form multiple sequence alignments (MSA), the system including:

a processing unit that executes a routine to estimate said phylogenetic tree;

memory coupled to said processing unit and storing said routine such that when said routine is executed by said processing unit said system carries out the following steps:

a) creating a profile of data represented by each node in a model of said phylogenetic tree;

b) using a symmetrized form of relative entropy to measure distance among nodes between subtrees to determine, at each agglomerative step, which nodes to merge in said model of said phylogenetic tree;

wherein topology of said phylogenetic tree is estimated.

2. The system of claim 1, wherein step (a) of said routine creates a model of data represented by each node of said phylogenetic tree using a Bayesian and information theoretic method;

wherein data represented by each said node is alignment of sequences descending from said node.

3. The system of claim 1, wherein in determining minimized encoding cost said system examines, for each sub-alignment corresponding to each subfamily, subfamily alignment for each sequence, and encoding for each position of said alignment.

4. The system of claim 1, wherein step (a) of said routine creates a model of data represented by each node of said phylogenetic tree using a Bayesian and information theoretic method to estimate amino acid distributions at every column in said MSA to create a model of all data descending therefrom;

wherein data represented by each said node is alignment of sequences descending from said node.

5. The system of claim 1, wherein step (a) of said routine represents data descending from said node using a Bayesian and information theoretic method employing Dirichlet mixture densities as priors over amino acid distributions to estimate posterior amino acid distributions in said model for said data represented by said node.

6. A system to determine cuts in a phylogenetic tree, representable as data arrayed to form multiple sequence alignments (MSA), that was agglomeratively formed such that encoding cost is measurable at every point in such agglomeration, the system including:

a processing unit that executes a routine to determine cuts to be made in said phylogenetic tree; and memory coupled to said processing unit and storing said routine such that when said routine is executed by said processing unit said system uses Dirichlet mixture densities to assign probabilities to individual columns in said MSA to determine at which point in said agglomeration encoding cost is minimized;

wherein a cut in said phylogenetic tree is identified.

7. The system of claim 6, wherein in determining minimized encoding cost said system uses a position-by-position measure of likelihood of subfamily alignments, given said Dirichlet mixture densities.

8. The system of claim 6, wherein in determining minimized encoding cost said system examines, for each sub-alignment corresponding to each subfamily, subfamily alignment for each sequence, and encoding for each position of said alignment.

9. The system of claim 6, wherein said phylogenetic tree classifies proteins.

10. The system of claim 6, wherein said system computes encoding costs under a first hypothesis that each subfamily chooses a same component of a Dirichlet density, and under a second hypothesis that each subfamily is permitted to chose a different component of a same Dirichlet density independently of other subfamily choices, and selects whichever of said first and second hypothesis provides minimum encoding cost.

11. A system that constructs at least one statistical model from data representing decomposition of a phylogenetic tree into subtrees produced using encoding cost measurements, the system including:
   a processing unit that executes a routine to construct a statistical model from said data; and
   memory coupled to said processing unit and storing said routine such that when said routine is executed by said processing unit said system constructs a statistical model for each subfamily in which subfamilies are equal in number to sequences in a subtree of said phylogenetic tree;
   wherein said statistical model is created in a position-dependent manner such that for every column in an alignment of data used as input to said system, making a measure whether all subfamilies have chosen a same or a different component of a Dirichlet density, and selecting a component-decision analysis providing a lower encoding cost outcome.

12. The system of claim 11, wherein said statistical model is a profile.

13. The system of claim 11, wherein said statistical model is a hidden Markov model.

14. The system of claim 13, wherein said system further computes amino acid distribution for a corresponding node of said hidden Markov model.

15. The system of claim 13, wherein each said statistical model is created using an estimation of independent counts for each subfamily;
   wherein said estimation accounts for subfamily alignment in its entirety to weigh subfamily sequences during parameter estimation of said hidden Markov model.

16. A system that provides position-by-position analysis from multiple sequence alignment (MSA) data, given a subfamily decomposition, the system comprising:
   a processing unit that executes a routine to provide said position-by-position analysis; and
   memory coupled to said processing unit and storing said routine such that when said routine is executed by said processing unit said system provides, within each subfamily, said position-by-position analysis by computing average conservation across subfamilies at each position in said MSA.

17. The system of claim 16, wherein said execution of said routine distinguishes general conservation from subfamily specific conservation.

18. The system of claim 16, wherein said routine uses Dirichiet mixture densities to identify positions at which subfamilies have chosen different components of said Dirichlet mixture density;
   wherein so-identified positions denote variable physico-chemical constraints among subfamilies.

19. The system of claim 16, wherein said routine identifies positions using a Bayesian and information theoretic analysis to yield minimum encoding costs.

20. The system of claim 18, wherein said routine identifies positions using a Bayesian and information theoretic analysis to yield minimum encoding costs, wherein same components of said Dirichaet mixture density are used.

21. The system of claim 18, wherein said routine identifies positions using a Bayesian and information theoretic analysis to yield minimum encoding costs, wherein different components of said Dirichlet mixture density are used.

22. A computer-readable storage medium wherein is located a computer program that causes a computer system having a processor unit to agglomeratively estimate a phylogenetic tree from input data arrayed to form multiple sequence alignments (MSA) by:
   creating a profile of data represented by each node in a model of said phylogenetic tree; and
   using a symmetrized form of relative entropy to measure distance among nodes between subtrees to determine, at each agglomerative step, which nodes to merge in said model of said phylogenetic tree.

23. The medium of claim 22, wherein creating said profile is carried out by creating a model of data represented by each node of said phylogenetic tree using a Bayesian and information theoretic method;
   wherein data represented by each said node is alignment of sequences descending from said node.

24. The medium of claim 22, wherein creating said profile is carried out by creating model of data represented by each node of said phylogenetic tree using a Bayesian and information theoretic method to estimate amino acid distributions at every column in said MSA to create a model of all data descending therefrom;
   wherein data represented by each said node is alignment of sequences descending from said node.

25. The medium of claim 22, wherein creating said profile is carried out by representing data descending from said node using a Bayesian and information theoretic method employing Dirichet mixture densities as priors over amino acid distributions to estimate posterior amino acid distributions in said model for said data represented by said node.

26. The medium of claim 22, wherein in determining minimized encoding cost is carried out by examining, for each sub-alignment corresponding to each subfamily, subfamily alignment for each sequence, and encoding for each position of said alignment.

27. A computer-readable storage medium wherein is located a computer program that causes a computer system having a processor unit to determine cuts in a phylogenetic tree, representable as data arrayed to form multiple sequence alignments (MSA), that was agglomeratively formed such that encoding cost is measurable at every point in such agglomeration by:
   using Dirichlet mixture densities to assign probabilities to individual columns in said MSA to determine at which point in said agglomeration encoding cost is minimized;
   wherein a cut in said phylogenetic tree is identified.

28. The medium of claim 27, wherein in determining minimized encoding cost is carried out using a position-by-position measure of likelihood of subfamily alignments, given said Dirichlet mixture densities.

29. The medium of claim 27, wherein determining minimized encoding cost is carried out by examining, for each sub-alignment corresponding to each subfamily, subfamily alignment for each sequence, and encoding for each position of said alignment.

30. The medium of claim 27, wherein determining minimized encoding cost is carried out by examining, for each sub-alignment corresponding to each subfamily, subfamily alignment for each sequence, and encoding for each position of said alignment.

31. The medium of claim 27, wherein said phylogenetic tree classifies proteins.

32. The medium of claim 27, wherein encoding costs are computed under a first hypothesis that each subfamily chooses a same component of a Dirichlet density, and are computed under a second hypothesis that each subfamily is permitted to chose a different component of a same Dirichlet density independently of other subfamily choices, and whichever of said first and second hypothesis provides minimum encoding cost is selected.

33. A computer-readable storage medium wherein is located a computer program that causes a computer system having a processor unit to construct at least one statistical model from data representing decomposition of a phylogenetic tree into subtrees produced using encoding cost measurements by:

constructing a statistical model from said data, including constructing a statistical model for each subfamily in which subfamilies are equal in number to sequences in a subtree of said phylogenetic tree;

wherein said statistical model is created in a position-dependent manner such that for every column in an alignment of data used as input to said system, making a measure whether all subfamilies have chosen a same or a different component of a Dirichlet density, and selecting a component-decision analysis providing a lower encoding cost outcome.

34. The medium of claim 33, wherein said statistical model is a profile.

35. The medium of claim 33, wherein said statistical model is a hidden Markov model.

36. The medium of claim 35, wherein amino acid distribution is computed for a corresponding node of said hidden Markov model.

37. The medium of claim 35, wherein:

each said statistical model is created using an estimation of independent counts for each subfamily; and said estimation accounts for subfamily alignment in its entirety to weigh subfamily sequences during parameter estimation of said hidden Markov model.

38. A computer-readable storage medium wherein is located a computer program that causes a computer system having a processor unit to provide position-by-position analysis from multiple sequence alignment (MSA) data, given a subfamily decomposition, by:

providing, within each subfamily, said position-by-position analysis by computing average conservation across subfamilies at each position in said MSA.

39. The medium of claim 38, wherein general conservation is distinguished from sub-family specific conservation.

40. The medium of claim 38, wherein Dirichiet mixture densities are used to identify positions at which subfamilies have chosen different components of said Dirichlet mixture density;

wherein so-identified positions denote variable physico-chemical constraints among subfamilies.

41. The medium of claim 38, wherein positions are identified using a Bayesian and information theoretic analysis to yield minimum encoding costs.

42. The medium of claim 40, wherein positions are identified using a Bayesian and information theoretic analysis to yield minimum encoding costs, wherein same components of said Dirichlet mixture density are used.

43. The medium of claim 40, wherein positions are identified using a Bayesian and information theoretic analysis to yield minimum encoding costs, wherein different components of said Dirichlet mixture density are used.

* * * * *

UNITED STATES PATENT AND TRADEMARK OFFICE
CERTIFICATE OF CORRECTION

PATENT NO.   : 6,128,587
DATED        : October 3, 2000
INVENTOR(S)  : Sjolander It is certified that error appears in the above-identified patent and that said Letters Patent is hereby corrected as shown below:

Column 7,
Line 42, after "symbol" delete"n," and insert therefor $-n_1-$;

Column 8,
Line 19, after "D(p∥q)=" delete "$\sum$" and insert therefor

Column 10,
Line 56, after "homology," delete "*CADIOS*" and insert therefor –CABIOS–;

Column 18,
Line 48, before "common fold," delete "is";

Signed and Sealed this

Fourteenth Day of August, 2001

*Attest:*

*Nicholas P. Godici*

*Attesting Officer*

NICHOLAS P. GODICI
*Acting Director of the United States Patent and Trademark Office*